United States Patent
Li

(10) Patent No.: US 10,124,527 B2
(45) Date of Patent: Nov. 13, 2018

(54) EXTRUSION PROCESS FOR POLYETHYLENE POLYMERS

(71) Applicant: NOVA Chemicals (International) S.A., Fribourg (CH)

(72) Inventor: Tieqi Li, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 97 days.

(21) Appl. No.: 15/126,723

(22) PCT Filed: Feb. 2, 2015

(86) PCT No.: PCT/IB2015/050786
§ 371 (c)(1),
(2) Date: Sep. 16, 2016

(87) PCT Pub. No.: WO2015/145271
PCT Pub. Date: Oct. 1, 2015

(65) Prior Publication Data
US 2017/0120499 A1    May 4, 2017

(30) Foreign Application Priority Data
Mar. 28, 2014  (CA) ...................... 2847628

(51) Int. Cl.
*B29C 47/60*    (2006.01)
*B29C 47/40*    (2006.01)
(Continued)

(52) U.S. Cl.
CPC .............. *B29C 47/402* (2013.01); *B29B 7/40* (2013.01); *B29C 47/0004* (2013.01);
(Continued)

(58) Field of Classification Search
CPC . B29C 47/402; B29C 47/004; B29C 47/6087; B29C 47/64; B29C 2947/9238;
(Continued)

(56) References Cited

U.S. PATENT DOCUMENTS 4,663,103 A * 5/1987 McCullough ....... B29C 47/0004
264/40.4
5,458,474 A   10/1995 Neubauer et al.
(Continued)

FOREIGN PATENT DOCUMENTS

EP    0 942 951 B1    3/2001
EP    1 829 660 A1    2/2007
(Continued)

OTHER PUBLICATIONS

ASTM D792-13; Standard Test Methods for Density and Specific gravity (Relative density) of Plastics by Displacement; Copyright ASTM International; Current edition approved Nov. 1, 2013. Published Nov. 2013. Originally approved in 1944. Last previous edition approved in 2008 as D792-08. pp. 1-6.
(Continued)

*Primary Examiner* — Stella K Yi
(74) *Attorney, Agent, or Firm* — Julie L. Heinrich

(57) ABSTRACT

A method for the improved extrusion of polyethylene polymers comprising passing polyethylene through a single stage, twin screw extruder comprising a solid polymer conveying zone, a polymer melting zone, a dispersive mixing zone, and a distributive mixing/pumping zone, in which the throughput and screw speed are optimized to reduce the number of gels present, ensure complete polymer melting within the polymer melting zone, and to minimize polymer degradation.

13 Claims, 3 Drawing Sheets

(51) Int. Cl.
  *B29C 47/00* (2006.01)
  *B29C 47/64* (2006.01)
  *B29B 7/40* (2006.01)
  *B29K 23/00* (2006.01)
(52) U.S. Cl.
  CPC .......... *B29C 47/6087* (2013.01); *B29C 47/64* (2013.01); *B29K 2023/065* (2013.01)
(58) Field of Classification Search
  CPC .... B29C 2947/92876; B29K 2023/065; B29B 7/40
  See application file for complete search history.

(56) References Cited

U.S. PATENT DOCUMENTS

| | | | |
|---|---|---|---|
| 5,730,885 | A | 3/1998 | Blakeslee et al. |
| 6,227,692 | B1 | 5/2001 | Heathe |
| 6,454,976 | B1 | 9/2002 | Neubauer |
| 6,485,662 | B1 | 11/2002 | Neubauer et al. |
| 7,393,916 | B2 | 7/2008 | Neubauer et al. |
| 7,714,072 | B2 | 5/2010 | Michie, Jr. et al. |
| 7,892,466 | B2 | 2/2011 | Li et al. |
| 8,079,747 | B2 | 12/2011 | Ek et al. |
| 2005/0127559 | A1 | 6/2005 | Eggen et al. |
| 2006/0245294 | A1 | 11/2006 | Burkhardt |

FOREIGN PATENT DOCUMENTS

| | | |
|---|---|---|
| EP | 2 243 610 A1 | 10/2010 |
| EP | 2 374 600 A1 | 10/2011 |
| WO | 2007/106417 A1 | 9/2007 |
| WO | 2011/026857 A1 | 3/2011 |
| WO | 2011/068525 A1 | 6/2011 |
| WO | 2011/101438 A1 | 8/2011 |
| WO | 2013/062810 A1 | 5/2013 |

OTHER PUBLICATIONS

ASTM D1238-13; Standard Test Method for Melt Flow Rates of Thermoplastics by Extrusion Plastometer; Copyright ASTM International; Current edition approved Aug. 1, 2013. Published august 2013. Originally approved in 1965. Last previous edition approved in 2010 as D1238-10. pp. 1-16.

ASTM D3895-07; Standard Test Method for Oxidative-Induction Time of Polyolefins by Differential Scanning Calorimetry; Copyright ASTM International; Current edition approved Apr. 1, 2007. Published Apr. 2007. Originally approved in 1980. Last previous edition approved in 2006 as D3895-06. pp. 1-8.

ASTM D6474-12; Standard Test Method for Determining Molecular Weight Distribution and Molecular Weight Averages of Polyolefins by High Temperature Gel Permeation Chromatography; Copyright ASTM International; current edition approved Dec. 15, 2012. Published Dec. 2012. Originally approved in 1999. Last previous edition approved in 2006 as D6474-99 (2006). pp. 1-6.

ASTM D6110-10; Standard Test Method for Determining the Charpy Impact Resistance of Notched Speciments of Plastics; Copyright ASTM International; Current edition approved Apr. 1, 2010. Published Apr. 2010. Originally approved in 1997. Last previous edition approved in 2008 as D6110-08. pp. 1-17.

ASTM D4703-10a; Standard Practice for Compression Molding Thermoplastic Materials into Test Speciments, Plaques, or Sheets; Copyright ASTM International; Current edition approved Nov. 1, 2010. Published Jan. 2011. Originally approved in 1991. Last previous edition approved in 2010 as D4703-10. pp. 1-13.

White, James L. and Kim, Eung Kyu; Twin Screw Extrusion—Technology and Principles: 1. Overview of Multi-Screw Extruders; 2nd Edition; Copyright Carl Hanser Verlag, Munich 2010; pp. 1-9.

White, James L. and Kim, Eung Kyu; Twin Screw Extrusion—Technology and Principles: 4. Technology of Intermeshing Co-Rotating Twin Screw Extruders; 2nd Edition; Copyright Carl Hanser Verlag, Munich 2010; pp. 63-91.

Kohlgruber, Klemens; Co-Rotating Twin-Screw Extruders—Fundamentals, Technology, and Applications; 1. Introduction; Copyright Hanser Publishers, Munich—2008, pp. 1-7.

Ullrich, Martin; Co-Rotating Twin-Screw Extruders—Fundamentals, Technology, and Applications; 2. Historical Development of Co-Rotating Twin Screw Extruders; Copyright Hanser Publishers, Munich—2008, pp. 9-34.

Rudolf, Reiner, Co-Rotating Twin-Screw Extruders—Fundamentals, Technology, and Applications; 4. General Overview of the Compounding Process: Tasks, Selected Applications, and Process Zones; Copyright Hanser Publishers, Munich—2008, pp. 57-89.

Chung, Chan I.; Extrusion of Polymers—Theory and Practice; 7. Physical Description of Twin-Screw Extruders; Copyright Carl Hanser Verlag, Munich 2000; pp. 329-339.

Andersen, Paul G., Dr.; Mixing and Compounding of Polymers—Theory and Practice; 25. Mixing Practices in Co-Rotating Twin Screw Extruders; 2nd Edition; Copyright Hanser Publishers, Munich; 2009; pp. 947-979.

Kalyon, Dilhan M.; Jacob, Cherian and Yaras, Piraye; An experimental study of the degree of fill and melt densification in fully-intermeshing, co-rotating twin screw extruders; Plastics, Rubber and Composites Processing and Applications 16, Copyright the Plastics and Rubber Institute (1991), pp. 193-200.

\* cited by examiner

EXTRUSION PROCESS FOR POLYETHYLENE POLYMERS

TECHNICAL FIELD

The invention relates to a polymer extrusion method. The method optimizes the operation of an extruder comprising a solid polymer conveying zone, a polymer melting zone, a dispersive mixing zone and a distributive mixing zone to reduce polymer gels and inhomogeneities in polyethylene polymers such as high density polyethylene.

BACKGROUND ART

Extrusion is often an important finishing step in the manufacture of polyethylene polymers. At some point downstream of a polymerization reactor, but upstream of an extruder, a polyethylene polymer will typically exist in granular form. The extruder is used to incorporate additives into the polymer and to compound and pelletize the polymer prior to use in commercial applications.

An extrusion process can be used to tailor the melt elasticity of conventional unimodal resins as described in U.S. Pat. Nos. 6,454,976; 7,892,466 and PCT Appl. No. 2007/106417 or alternatively to homogenize high and low molecular weight fractions in bimodal or multimodal polyethylene resins as described in U.S. Pat. Nos. 7,714,072; 8,079,747; U.S. Pat. Appl. Pub. No. 2005/0127559, and PCT Appl. Nos 2013/062810 and 2011/101438.

An extruder can reduce gels in a polymeric material by optimizing extruder process design or by incorporating a filter which screens for gels of a specific size as discussed in U.S. Pat. Nos. 5,730,885; 6,485,662; 7,393,916 and Eur. Pat. No. 942951.

Among the most common extruder designs used in the production of polyethylene polymers are those employing a co-rotating twin screw extruder (a "co-TSE") or a continuous internal mixer with counter-rotating rotors.

The general state of the art in co-rotating twin screw extrusion methods has been well catalogued in recent publications such as James L. White and Eung K. Kim in *Twin Screw Extrusion: Technology and Principles* ($2^{nd}$ Ed.) Carl Hanser Verlag, Munich 2010; Klemens Kohlgruber and Werner Wiedmann, in *Co-rotating Twin-Screw Extruders: Fundamentals, Technology, and Applications*, Hanser, Munich 2008; Chan I. Chung in *Extrusion of Polymers: Theory and Practice*, Carl Hanser Verlag, Munich 2000; and Paul Anderson in *Mixing and Compounding of Polymers* ($2^{nd}$ Ed), Ed. Manas-Zloczower, Tadmore 2009, Chapter 25, p. 947. Nevertheless, extruder set-up and operation is open to manipulation in order to operate best with a certain polymer type, optimize polymer properties, and to optimize polymer throughput rates. Hence an extruder process can be designed to: maximize polyethylene polymer throughput, minimize polyethylene polymer gel content, and/or improve polyethylene resin performance attributes such as resistance to oxidation, slow crack growth resistance and impact toughness.

Gels in polyethylene polymers generally correspond to localized polymer domains where optical and/or physical properties are significantly different from the polymer bulk, and are generally considered to be defects. When a polyethylene resin is made into for example a film, the gels will typically have different optical properties, allowing them to be identified and quantified with instrumentation such as an OCS gel camera. Gel content is often an important quality control parameter for the production of polyethylene resins.

As discussed above, gels can be eliminated or reduced by using a filter screen in combination with an extruder. Although this method works well for gels which consist of cross-linked polymer or foreign substances, it does not work well with high density polyethylene polymers of high molecular weight or multimodal polyethylene resins, in which polymer inhomogeneity leads to gel formation. Polymers containing high molecular weight fractions produce a high viscosity polymer melt during extrusion. High viscosities lead to a large pressure drop across the filter screen and can drop the polymer throughput to unacceptable levels. A high polymer melt viscosity can also increase the polymer melt temperature to a level beyond which polymer degradation occurs and the polymer properties are compromised.

To address this problem, gels have been reduced by using a modified extruder design. For example, use of a continuous mixer that includes an additional "independently controlled" secondary mixer to enhance mixing, substantially removes gels as discussed in U.S. Pat. No. 5,458,474.

Alternatively, and as shown in U.S. Pat. Appl. Pub. No. 2006/0245294, an extruder consisting of two co-rotating twin screw extruders where the downstream extruder is dedicated to mild kneading can be used to reduce gels. The mild kneading section which is a dispersive mixing zone reduces gels that are mainly un-melted nascent polymer particles or undispersed polymer components of high molecular weight. This extruder design, known commercially as ZSK-NT™ effectively separates the extrusion into two stages: in the first stage, the polymer is gently melted; in the second stage, the high molecular weight polymer fractions are homogenized through a dispersive mixing process.

Despite these successes, the forgoing extruders are far more expensive than conventional twin screw extruders. Hence, it would be advantageous to provide a polymer extrusion method which achieves good polymer properties and high extruder throughputs by manipulating a conventional co-rotating twin screw extruder.

It is known that to induce dispersive mixing, extensional or elongational type polymer flows are necessary. In a co-rotating twin screw extruder this may be effectively achieved by subjecting the polymer melt to specific kneading elements. A dispersive mixing kneading element can be a combination of multiple kneading blocks which are typically staggered disks forming a fixed angle to one another. Such a kneading element may also comprise a single unit that has a geometry equivalent to that of a number of staggered disks. These kneading disks normally have a contoured surface that is not parallel to the screw axis and which bears one or more edges or vortices that present minimal clearance relative to extruder barrel together with surfaces positioned at a greater distance from the barrel. The disk and the barrel thus form a flow channel that forces the polymer melt into alternatingly expanding and contracting when the screws are rotating. The extensional flow thus generated is efficient for dispersive type mixing which can reduce gels. While the extensional flows generated by these kneading disks are the most efficient manner by which to generate dispersive mixing, the use of such elements is limited in the following ways. First, these kneading elements generally lead to high energy input and hence high melt temperature, especially in extruders used for commercial polyolefin production where heat is not effectively removed due to the size of the extruder. The excessive heat may in turn result in polymer degradation. To avoid overheating the resin, the screws have to be operated at reduced speed. The reduced screw speed, however, leads to lower polymer throughput because melting capability is proportional to the screw speed for given screw configuration.

One manner by which to alleviate the temperature rise is to use kneading elements having a different profile. For example, as disclosed in Eur. Pat. Appl. No. 2,374,600, kneading elements designed for reduced shear at the extruder barrel can be used. This approach, however, may have its own limitations in that the design would employ a larger clearance between the kneading elements and the extruder barrel which can reduce the overall pumping efficiency of the extruder.

A different limitation is encountered if extra dispersive mixing kneading disks are employed. As the kneading disks are usually fully filled, they cause higher torque and specific mechanical energy at the same level of throughput. Since the power or torque allowed for the given extruder is limited, the polymer throughput rate can be similarly limited.

New extruder designs are necessary to reduce defects, while minimizing cost and maintaining high throughputs. This is especially true for polyethylene in which distinct high and low molecular weight fractions are present as they can be difficult to homogenize, leading to gels or defects in the finished resin. Such resins often find applications in high pressure pipe, blow molding formulations and a wide range of blown films.

DISCLOSURE OF INVENTION

We have now found, that manipulating the entire screw configuration of a conventional co-rotating twin screw extruder in order to introduce an appropriate balance of dispersive mixing and polymer melt temperatures, reduces gels and homogenizes high molecular weight fractions in a polyethylene polymer.

The invention circumvents the need for increased capital expenditure for a secondary mixer or a secondary extruder which operates under different shear conditions.

By using optimal screw speeds with appropriate dispersive elements (e.g., kneading blocks) in combination with an optimized polymer melting zone and melt pool length, polymer gels are reduced using a basic twin screw extruder design, while maintaining good polymer throughput.

The invention increases polymer homogenization and dispersion of high molecular weight fractions, which can improve polymer toughness as indicated by for example slow crack growth and impact resistance properties.

The present invention is applicable to extrusion compounding of polyolefins with co-TSE.

Provided is a method for extruding polyethylene, the method comprising passing the polyethylene through a single stage, twin screw extruder comprising:

a) a solid polymer conveying zone;
b) a polymer melting zone immediately downstream of the solid polymer conveying zone where the distance between the beginning of the polymer melting zone and the screw terminal end is less than 50% of the screw length;
c) a dispersive mixing zone downstream of the polymer melting zone, the dispersive mixing zone comprising one or more dispersive mixing element(s);
d) a distributive mixing zone downstream of the dispersive mixing zone, the distributive mixing zone comprising one or more distributive mixing element(s);
e) at least one pumping element between the polymer melting zone and the dispersive mixing element(s);
f) at least one pumping element between the dispersive mixing element(s) and the distributive mixing element(s);
g) and a pumping zone downstream of the distributive mixing zone;

wherein the polyethylene is passed through the single stage, twin screw extruder at a screw speed and throughput rate which completely melts the polyethylene within the polymer melting zone and which keeps the polymer melt temperature in the extruder below a temperature at which degradation of the polyethylene occurs.

Provided is a method for extruding polyethylene, the method comprising passing the polyethylene through a single stage, twin screw extruder comprising: a solid polymer conveying zone; a polymer melting zone immediately downstream of the solid polymer conveying zone where the distance between the beginning of the polymer melting zone and a screw terminal end is less than 50% of the screw length; a dispersive mixing zone downstream of the polymer melting zone; a distributive mixing zone downstream of the dispersive mixing zone; and a pumping zone downstream of the distributive mixing zone; wherein the polyethylene is passed through the single stage, twin screw extruder at a screw speed and throughput rate which completely melts the polyethylene within the polymer melting zone and which keeps the polymer melt temperature in the extruder below a temperature at which degradation of the polyethylene occurs.

In an embodiment of the invention, the polymer melting zone has a length which is 5 to 15% of the screw length.

In an embodiment of the invention, the twin screw extruder is a co-rotating twin screw extruder.

In an embodiment of the invention, the twin screw extruder is operated at a throughput rate of 0.67 M to M in kg of polymer/hour, where $M=a\,D^b$, D is the diameter of the extruder barrel in mm, b=3.04, and $a=1.54\times10^{-3}$ in kg polymer/hr/mm$^b$.

In an embodiment of the invention, the extruder is operated at a screw speed of from 230 to 400 rpm.

In an embodiment of the invention, after passing through the single stage, twin screw extruder the polyethylene has less than 25 ppm of gels.

In an embodiment of the invention, after passing through the single stage, twin screw extruder the polyethylene has less than 15 ppm of gels.

In an embodiment of the invention, the polyethylene is a high density polyethylene having a density of from 0.939 to 0.960 g/cm$^3$.

In an embodiment of the invention, the polyethylene is a high density polyethylene having a high load melt index $I_{21}$ of from 2 to 15 g/10 min.

In an embodiment of the invention, after passing through the single stage, twin screw extruder a polyethylene has an OIT of at least 40 min, provided that the polyethylene contains at least 500 ppm of each of Irganox 168™ and Irganox 1010™.

In an embodiment of the invention, after passing through the single stage, twin screw extruder a high density polyethylene has an OIT of at least 40 min, provided that the high density polyethylene contains at least 500 ppm of each of Irganox 168™ and Irganox 1010™.

In an embodiment of the invention, the polyethylene is a high density polyethylene and is passed through the extruder at a throughput rate of at least 9500 kg/hour with a twin screw extruder having an internal barrel diameter of at least 177 mm.

In an embodiment of the invention, the polyethylene is passed through the single stage, twin screw extruder at a screw speed and throughput rate which reduces the number of gels present in the polyethylene by at least 50%.

In an embodiment of the invention, the polyethylene is a high density polyethylene and is passed through the single stage, twin screw extruder at a screw speed and throughput rate which reduces the number of gels present in the high density polyethylene by at least 50%.

In an embodiment of the invention, the polyethylene is passed through the single stage, twin screw extruder at a screw speed and throughput rate which increases the oxygen induction time (OIT) of the polyethylene by at least 200%.

In an embodiment of the invention, the polyethylene is a high density polyethylene and is passed through the single stage, twin screw extruder at a screw speed and throughput rate which increases the oxygen induction time (OIT) of the high density polyethylene by at least 200%.

Provided is a method for extruding polyethylene, the method comprising passing the polyethylene through a single stage, twin screw extruder comprising:

a) a solid polymer conveying zone;
b) a polymer melting zone immediately downstream of the solid polymer conveying zone where the distance between the beginning of the polymer melting zone and the screw terminal end is less than 50% of the screw length;
c) a dispersive mixing zone downstream of the polymer melting zone, the dispersive mixing zone comprising one or more dispersive mixing element(s);
d) a distributive mixing zone downstream of the dispersive mixing zone, the distributive mixing zone comprising one or more distributive mixing element(s);
e) at least one pumping element between the polymer melting zone and the dispersive mixing element(s);
f) at least one pumping element between the dispersive mixing element(s) and the distributive mixing element(s);
g) and a pumping zone downstream of the distributive mixing zone;
wherein the polyethylene is passed through the single stage, twin screw extruder at a screw speed and throughput rate which completely melts the polyethylene within the polymer melting zone; keeps the polymer melt temperature in the extruder below a temperature at which degradation of the polyethylene occurs; and reduces the number of gels present in the polyethylene by at least 50 percent.

Provided is a method for extruding polyethylene, the method comprising passing the polyethylene through a single stage, twin screw extruder comprising: a solid polymer conveying zone; a polymer melting zone immediately downstream of the solid polymer conveying zone where the distance between the beginning of the polymer melting zone and a screw terminal end is less than 50% of the screw length; a dispersive mixing zone downstream of the polymer melting zone; a distributive mixing zone downstream of the dispersive mixing zone; and a pumping zone downstream of the distributive mixing zone; wherein the polyethylene is passed through the single stage, twin screw extruder at a screw speed and throughput rate which completely melts the polyethylene within the polymer melting zone; keeps the polymer melt temperature in the extruder below a temperature at which degradation of the polyethylene occurs; and reduces the number of gels present in the polyethylene by at least 50 percent.

BEST MODE FOR CARRYING OUT THE INVENTION

Figure 1:
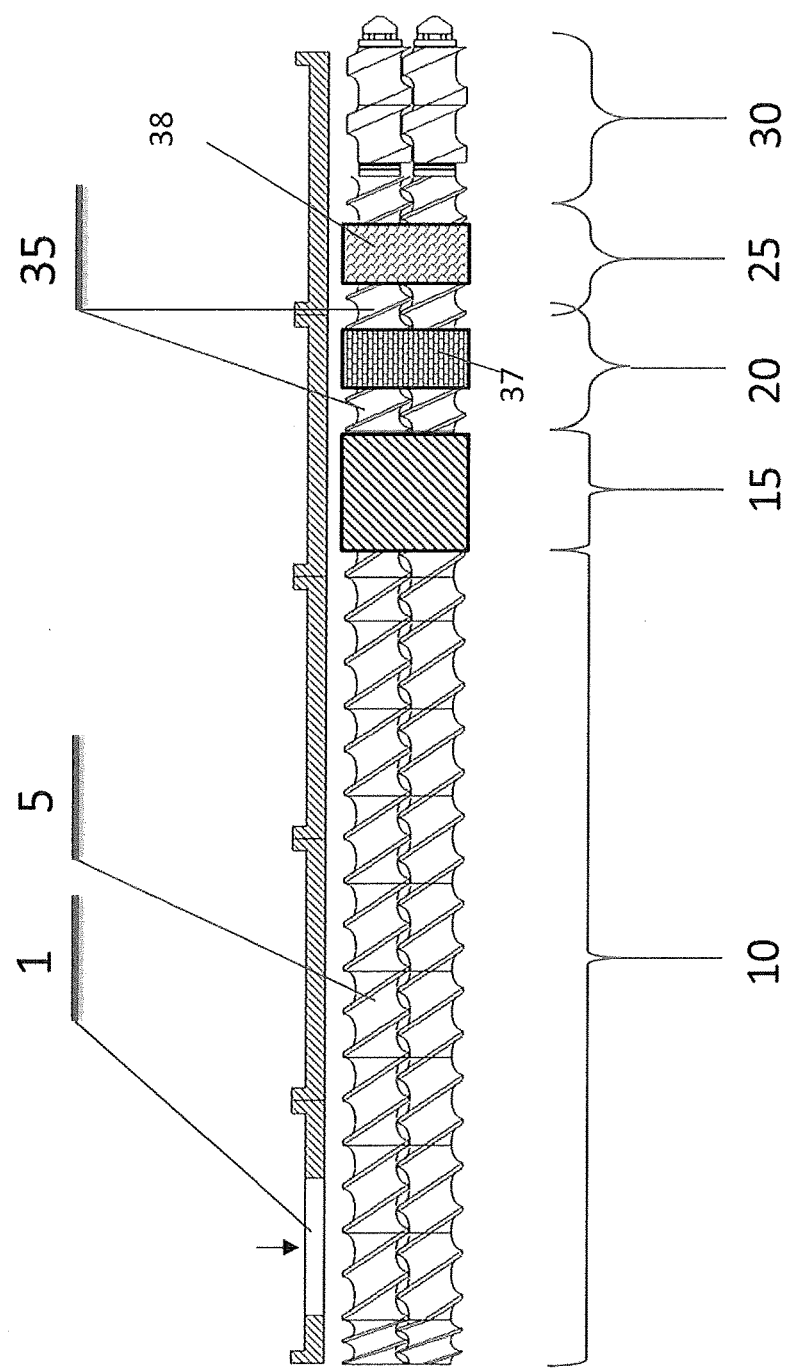
FIG. 1 shows a top plan view (in partial cross-section; the extruder barrel is cut away) of a twin screw extruder having both a dispersive mixing zone and a distributive mixing zone. This extruder configuration is used in an embodiment of the invention.

A screw of the twin screw extruder of the present invention may be assembled by mounting individual screw elements onto a central shaft. Screw elements useful in the present invention are described further below but can be selected from a group consisting of but not limited to polymer melting elements, polymer melt conveying elements, pumping elements, distributive mixing elements, dispersive mixing elements, and the like, all of which are well known to persons skilled in the art.

Generally speaking "dispersive mixing" as it is well understood in the art may occur within a polymer melting zone (also known as a plastification zone) as well as within a dispersive mixing zone per se. For a thorough description of "dispersive mixing" in a polymer extrusion process see for example Chapter 9, "Mixing and Dispersing Principles" in Co-Rotating Twin-Screw Extruders—Fundamentals, Technology, and Applications, Edited by: Kohlgrüber, Klemens © 2008 Hanser Publishers. In the present invention the polymer melting zone is distinguished from the dispersive mixing zone by the type of screw elements employed in each zone and more particularly by the main job being performed by the extruder in each zone.

In the present invention, the "polymer melting zone" is designed to impart primarily shear stresses and heat to completely convert the solid polymer into a molten polymer state, preferably without further input of energy once complete melting has occurred. Hence, it is preferred that the polymer melting process is completed at or near of the end of the polymer melting zone. On the other hand the "dispersive mixing zone" is designed to impart primarily dispersive mixing forces on a molten polymer. In the present invention, dispersive mixing in the dispersive mixing zone basically involves the disaggregation of inhomogeneous polymer components such as high molecular weight polymer components which are melted but exist as a separate domains in the bulk of the molten polymer matrix and/or disaggregation (i.e. dispersion) of additive particles/clusters present within the polymer melt. Such dispersion requires the polymer melt to encounter critical shear and extensional (or "elongational") flow rates over a sufficient period of time.

In contrast to dispersive mixing which disaggregates components within the polymer melt, "distributive mixing" is directed to the distribution of different components within the polymer matrix volume. For example, two components may change places with one another or undergo rearrangement with other components within the entire polymer matrix. Screw elements can be selected to promote distributive mixing. For example, in the distributive mixing zone, gear-like mixing elements such as turbine mixing elements (TME) or Zahn Misch elements (ZME) can be used. During distributive mixing the number and type of rearrangements occurring, rather than the shear stress and flow rates achieved, improves the homogeneity of the polymer (i.e. the quality of the distribution of components throughout the polymer matrix improves). For a thorough description of "distributive mixing" in a polymer extrusion process see for example Chapter 9 "Mixing and Dispersing: Principles" in Co-Rotating Twin-Screw Extruders—Fundamentals, Technology, and Applications, Edited by: Kohlgrüber, Klemens © 2008 Hanser Publishers.

The extruder used in the present invention can be used in stand-alone applications, but in a preferred embodiment of the invention, an extruder is incorporated into a polymerization plant.

Polymer

The extrusion method of the present invention can be used to extrude any polyolefin or polyolefins, or it can be used to blend any two or more polyolefins. Polyolefins which may be extruded using the method of the present invention are preferably ethylene polymers or ethylene copolymers. Suitable comonomers for polymerization with ethylene can include by way of non-limiting examples, propene, 1-butene, 1-pentene, 1-hexene and 1-octene. Such ethylene polymers or ethylene copolymers include for example, linear low density polyethylene (LLDPE) and high density polyethylene (HDPE) both of which are well known to persons skilled in the art.

The extrusion method of the present invention can be used to extrude ethylene homopolymers or ethylene copolymers containing other materials or additives which are well known in the art such as other polyolefin polymers, pigments, fillers, antioxidants, stabilizers and the like.

In an embodiment of the invention, ethylene homopolymers or ethylene copolymers of different weight average molecular weight are extrusion blended. The high and low molecular weight ethylene copolymers or ethylene homopolymers may differ in weight average molecular weight by at least 10,000 g/mole, or at least 25,000 g/mol, or at least 50,000 g/mole, or at least 75,000 g/mole, or at least 100,000 g/mole, or at least 150,000 g/mole, or at least 200,000 g/mole.

In an embodiment of the invention, a high density polyethylene (HDPE) is extruded.

High density polyethylene (HDPE) can be a homopolymer or a copolymer of ethylene. Suitable comonomers include alpha olefins such as but not limited to 1-propylene, 1-butene, 1-pentene, 1-hexene and 1-octene.

The HDPE can have a density of from 0.935 to 0.970 g/cm$^3$ as measured according to the procedure of ASTM D-792. In an embodiment of the invention, a HDPE, having a density of from 0.939 to 0.969 g/cm$^3$ is extruded. In an embodiment of the invention, a HDPE, having a density of from 0.939 to 0.965 g/cm$^3$ is extruded. In an embodiment of the invention, a HDPE, having a density of from 0.939 to 0.960 g/cm$^3$ is extruded. In an embodiment of the invention, a HDPE, having a density of from 0.940 to 0.969 g/cm$^3$ is extruded. In an embodiment of the invention, a HDPE, having a density of from 0.940 to 0.965 g/cm$^3$ is extruded. In an embodiment of the invention, a HDPE, having a density of from 0.940 to 0.960 g/cm$^3$ is extruded. In an embodiment of the invention, a HDPE, having a density of from 0.940 to 0.955 g/cm$^3$ is extruded. In an embodiment of the invention, a HDPE, having a density of from 0.939 to 0.950 g/cm$^3$ is extruded.

The HDPE can have a melt index, $I_2$ of less than 1 g/10 min or greater than 1 g/10 min as measured according to the procedure of ASTM D-1238 (at 190° C.) using a 2.16 kg weight. In embodiments of the invention, a HDPE having a melt index, $I_2$ of less than 10 g/10 min, or less than 5 g/10 min, or less than 1 g/10 min or less than 0.75 g/10 min, or less than 0.5 g/10 min or less than 0.25 g/10 min is extruded.

The HDPE resin may have a high load melt index $I_{21}$ of from 1 to 30 g/10 min, or from 1 to 20 g/10 min, or from 2 to 15 g/10 min as measured according to the procedure of ASTM D-1238 (at 190° C.) using a 21.6 kg weight. In embodiments of the invention, a HDPE having a high load melt index, $I_{21}$ of from 1 to 30 g/10 min, or from 1 to 20 g/10 min, or from 2 to 15 g/10 min is extruded.

HDPE can made using any of the well-known catalysts capable of generating HDPE, such as chromium catalysts, Ziegler-Natta catalysts and so called "single site catalysts" such as but not limited to metallocene catalysts, constrained geometry catalysts, and phosphinimine catalysts. HDPE can be made in a solution phase, a slurry phase or a gas phase, polymerization process employing a suitable reactor design for that purpose.

In an embodiment of the invention, the extruded HDPE can be a unimodal polymer. In an embodiment of the invention, the extruded HDPE can be a unimodal polymer made with an organic chromium catalyst in a single gas phase reactor.

The HDPE may comprise two or more polymer components which may for example differ substantially in weight average molecular weight and/or comonomer content and distribution. Such polymers can be made by for example, using similar catalysts in two or more reactors operating under different conditions, using dissimilar catalysts in a single reactor, or using dissimilar catalysts in two or more reactors operating under similar or different conditions. Alternatively, such polymers can be made by blending two different polymers, one with a relatively lower molecular weight, and one with a relatively higher molecular weight. Where the HPDE comprises two or more polymer components having substantially different weight average molecular weights, a gel permeation chromatograph may show two or more distinct areas, as opposed to a single broad area. Such a resin may be called bimodal (two distinct peaks or components are evident in a GPC chromatograph) or multimodal (more than two distinct peaks or components are evident in a GPC chromatograph), as opposed to monomodal or unimodal (one distinct peak or component is evident in a GPC chromatograph).

The HPDE may comprise a high molecular weight ethylene homopolymer or ethylene copolymer component having a weight average molecular weight of more than 200,000 g/mole.

The HPDE may comprise a high molecular weight ethylene homopolymer or ethylene copolymer component having a weight average molecular weight of from 200,000 to 700,000 g/mole.

In an embodiment of the invention, a HDPE with a broad unimodal profile, as determined by gel permeation chromatography, is extruded.

In an embodiment of the invention, a HDPE with a bimodal profile, as determined by gel permeation chromatography, is extruded.

In an embodiment of the invention, a HDPE with a multimodal profile, as determined by gel permeation chromatography, is extruded.

In an embodiment of the invention, a HDPE which comprises at least two component ethylene polymers or ethylene homopolymers, such as for example a HDPE comprising a high and a low weight average molecular weight ethylene homopolymer or ethylene copolymer component, is extruded.

In embodiments of the invention, a HDPE having a weight average molecular weight of >140,000 g/mol, or >200,000 g/mol is extruded.

In an embodiment of the invention, a HDPE which finds application in large part blow molding, compression molding, large bubble film blowing, conduits, sheet extrusion, pressure pipe, bottles, extrusion coating, injection molding, or caps and closures, is extruded.

Single-Stage Twin Screw Extruder Design

The terms "throughput" or "throughput rate" which are connoted herein by the letter M, are well understood by persons skilled in the art, and indicate the amount of polymer processed by the extruder in mass per unit of time (e.g. kg of polymer extruded per hour).

The extruder screw speed, which is connoted herein by the letter N is given as revolutions per minute (rpm) as is well understood in the art.

The extruder used in the present invention is a single stage twin screw extruder. A co-rotating twin screw extruder is preferred in an embodiment of the invention, although a counter-rotating twin screw extruder is also contemplated. Such extruders are well known in the art and have 2 barrels (i.e. ∞—shaped barrels in cross-section), each barrel with an internal diameter D, and two intermeshing screws each with a length L.

In an embodiment of the invention, the extruder will have a length to diameter ratio (L/D) of from 10 to 40. In an embodiment of the invention, the extruder will have a length to diameter ratio (L/D) of from 12 to 24.

FIG. 1 shows a top plan (partial cross-section with the barrel cut away to expose the screw elements) view of a twin screw extruder design used in an embodiment of the present invention. Solid polymer is fed to the screws 5 through an opening 1 in the extruder barrel and onto a solid polymer conveying zone 10. Downstream of the solid polymer conveying zone is a polymer melting zone 15. Downstream of the polymer melting zone is a dispersive mixing zone 20. The dispersive mixing zone includes one or more dispersive mixing elements 37. Downstream of the dispersive mixing zone is a distributive mixing zone 25. The distributive mixing zone includes one or more distributive mixing elements 38. There may be some overlap between the dispersive mixing zone and the distributive mixing zone, but not between dispersive mixing elements and distributive mixing elements. Finally, downstream of the distributive mixing zone is a pumping zone 30. There may be some overlap between the distributive mixing zone and the pumping zone.

In an embodiment of the invention at least one pumping screw element 35 will be present in the dispersive mixing zone between the polymer melting zone and the dispersive mixing elements. In an embodiment of the invention at least one pumping element 35 will also be present between the dispersive mixing elements and the distributive mixing elements.

In the present invention, the distance between the beginning of the polymer melting zone and a screw terminal end will be less than 50% of the screw length L. By starting the melting of the polymer at a point closer to the screw terminal end, the length of the polymer melt pool is reduced (i.e. a short "melt wetted length", or the length of the screw that is in contact with polymer melt). Without wishing to be bound by theory, this minimizes the amount of time the polymer is subjected to high melt temperatures and high shear stresses, with the effect of improving the integrity of the extruded polymer by reducing polymer crosslinking, decomposition or the like (which can result in gels and polymer defects or loss of polymer physical and optical properties). In addition, by reducing the length of the melt wetted length, the energy requirements for the extruder can be minimized. The length of the extruder required can also be minimized by reducing the length of the polymer melt.

In an embodiment of the invention, the distance between the beginning of the polymer melting zone and a screw terminal end will be 40% or less of the screw length L. In another embodiment of the invention, the distance between the beginning of the polymer melting zone and a screw terminal end will be 35% or less of the screw length L. In yet another embodiment of the invention, the distance between the beginning of the polymer melting zone and a screw terminal end will be 30% or less of the screw length L.

To further reduce the length of the "melt wetted length", the length of the polymer melting zone should be as short as possible, while still fully melting the polymer within the polymer melting zone.

In an embodiment of the invention, the polymer melting zone comprises from 5 to 25% of the overall length of the screw. In an embodiment of the invention, the polymer melting zone comprises from 5 to 20% of the overall length of the screw. In an embodiment of the invention, the polymer melting zone comprises from 5 to 15% of the overall length of the screw. In an embodiment of the invention, the polymer melting zone comprises from 5 to 12.5% of the overall length of the screw. In an embodiment of the invention, the polymer melting zone comprises from 5 to 10% of the overall length of the screw.

In an embodiment of the invention, the polymer melting zone comprises a plurality of kneading blocks having a total length of from 1 to 4 times the internal diameter of the extruder barrel (D).

It is widely believed that gels are inhomogeneities that are present in a polymer. In some cases the inhomogeneities arise from foreign species such as contaminants or from additives. Another explanation is that the inhomogeneities arise from the bulk polymer itself, but are either domains which are not fully melted in the extruder or are domains which are not completed homogenized with the bulk polymer. These types of inhomogeneity (i.e. made from the same bulk polymer) can be present as gels if they have physical or mechanical properties which are significantly different from the bulk. In some cases, oxidized gels are formed from such unmelted/unhomogenized domains because these areas are not as likely to have sufficient amounts of antioxidants in intimate contact with polymer chains and are hence more prone to oxidative thermodegradation. Having all the polymer melted within polymer melting zone not only minimizes the potential of forming such oxidized gels, but also enables downstream dispersive mixing to act solely on dispersing polymer inhomogeneities caused by unmixed polymer components or additives, rather than un-melted particles or zones.

In the present invention, the polymer melting zone immediately follows the polymer solid conveying section. The polymer melting zone comprises a combination of screw elements which are selected from those which are well known to persons skilled in the art, but under conditions which ensure complete melting of the polymer within the polymer melting zone, preferably at or near the end of the polymer melting zone.

In the present invention, it is preferred that the polymer be completely melted within the polymer melting zone. This is so substantially no un-melted polymer particles are present prior to entry to the dispersive mixing zone. The unmelted particles are a potential source of gels, whether or not they are of the crosslinked variety. Note, however, they can easily form crosslinked gels when the melt temperature is high because of the low local concentrations of antioxidants. The complete melting of the polymer at the end of the melting zone not only minimizes the chance of forming oxidized gels but also ensures that within the dispersive mixing zone, mixing energy is used principally for dispersing additives and melted polymers of higher molecular weight into the matrix, rather than being consumed by continuing to melt the polymer. By ensuring the polymer is fully melted in the polymer melting zone, and by separating polymer melting from dispersive mixing, one maximizes the efficiency of the "extensional" or "elongational" mixing in the dispersive mixing zone which in turns minimizes polymer defects or gels.

In embodiments of the invention, the polymer within the polymer melting zone will be completely melted close to, near or at the end of the polymer melting zone. As such, the polymer melting zone should be designed to incorporate suitable polymer melting elements and to have a suitable length for an extruder of a given size.

To ensure that the polymer is completely melted near the end of the polymer melting zone, both simulation and experiments can be performed by persons skilled in the art. For example, complete melting within the polymer melting section can be ensured by carrying out the following type of experimental procedures.

Test 1. Extrude a polymer of interest using a specific throughput (extruder design rate) over a series of decreasing screw speeds (N) while observing the change in torque as a function of screw speed. The screw speed at which an abrupt rise in torque is observed (over a small reduction of screw speed), $N_{min}$, is the condition under which polymer melting has completed at and only at the end of the polymer melting section.

Test 2. Extrude a polymer of interest at a specific screw speed $N>N_{min}$, over a series of increasing throughputs (extruder design rates) while observing the change in torque as a function of throughput. The throughput at which an abrupt rise in torque is observed (over a small change in throughput) is the condition under which polymer melting has completed at and only at the end of the polymer melting section for this screw speed.

As an alternative to the above, well known extrusion simulation software can be used to determine conditions under which complete melting occurs at the end of the polymer melting zone. Such whole-extruder simulation software includes for example the WINTXs™ software package. A proper simulation requires calibrating extruder-specific parameters and polymer property input from known experiments as would be well known by persons skilled in the art.

In order to ensure that the melted polymer is pumped forward from polymer melting zone as soon as possible to avoid overheating in the energy intensive melting zone and to pump the polymer melt through the mixing element, it may be preferable to include at least one pumping screw element between the polymer melting zone and the dispersive mixing elements. This can be a simple melt conveying element that has the geometry to allow a fill factor of 0.3 to 0.7 at the operation screw speed and throughput. Fill factor may be defined as the ratio of polymer melt volume to available free volume at a given screw speed. It can be determined as the degree of fill with methods well known to persons skilled in the art; see for example: D. M. Kalyon, C. Jacob and P. Yaras, *Plastics, Rubber and Composites Processing and Applications*, 16 (3), 193-200 (1991). For similar reasons, it may be preferable to include at least one pumping element between the dispersive mixing element(s) and the distributive mixing element(s).

In the present invention, for a given resin, the temperature in the polymer melting zone will be at or near the polymer melting point, or slightly higher than the polymer melting point. For example, the temperature of the polymer melting zone may be from 1 to 10° C. higher than the melting point of a polyethylene polymer, or from 1 to 5° C. higher than the melting point of a polyethylene polymer or form 5 to 10° C. higher than the melting point of a polyethylene polymer. It should be kept in mind that such temperatures will depend on the nature of the polyethylene polymer and in no instance should exceed a temperature at which measurable polymer degradation occurs.

In the present invention, the dispersive mixing zone requires screw elements that impart strong elongational flow, which leads to dispersive mixing. However, the intensive flow may, at high screw speeds lead to high melt temperature and polymer degradation. In the case where kneading disks are used, the broader the disks are, the more effective the disks are for dispersive mixing but there is a correspondingly greater temperature increase. As such, the choice of kneading elements, extruder throughput and screw speed must be such that good dispersive mixing of a fully melted polymer occurs, while also avoiding a significant melt temperature increase, or temperatures at which polymer degradation occurs. Such choices must be optimized for a given polymer being extruded.

In an embodiment of the invention, the polymer melt in the dispersive mixing zone will have a temperature not significantly higher than that in the polymer melting zone. In yet another embodiment of the invention, the polymer melt in the dispersive mixing zone will experience an increase in temperature of 75° C. or less relative to the temperature in the polymer melting zone. In yet another embodiment of the invention, the polymer melt in the dispersive mixing zone will experience an increase of temperature of 60° C. or less relative to the temperature in the polymer melting zone. In yet another embodiment of the invention, the polymer melt in the dispersive mixing zone will experience an increase of temperature of 50° C. or less relative to the temperature in the polymer melting zone. In yet another embodiment of the invention, the polymer melt in the dispersive mixing zone will experience an increase of temperature of 40° C. or less relative to the temperature in the polymer melting zone. In yet another embodiment of the invention, the polymer melt in the dispersive mixing zone will experience an increase of temperature of 30° C. or less relative to the temperature in the polymer melting zone. In yet another embodiment of the invention, the polymer melt in the dispersive mixing zone will experience an increase of temperature of 25° C. or less relative to the temperature in the polymer melting zone. In still yet another embodiment, the polymer melt in the dispersive mixing zone will experience an increase of temperature of 10° C. or less relative to the temperature in the polymer melting zone.

In an embodiment, the polymer melt in the dispersive mixing zone will experience a temperature in the range of from about 180° C. to about 210° C. In further embodiments, the polymer melt in the dispersive mixing zone will experience a temperature of 210° C. or less, of 200° C. or less, or of 190° C. or less.

By "polymer degradation" it is meant that the polymer physically begins to degrade either through decomposition pathways which lead to loss of weight or through crosslinking or scission pathways which may lead to changes in chain length and physical properties, but not necessarily to polymer decomposition. The latter type of degradation in an extruder is especially detrimental because it leads to cross-linked gels. A person skilled in the art can determine a temperature at which a given polymer begins to degrade by examining the effect of temperature (or extruder conditions, such as temperature) on polymer rheology and physical properties.

A HDPE melt is usually most vulnerable to degradation only in absence of effective antioxidants (AO) and with exposure to high melt temperatures and long residence times. As discussed above, un-melted polymer particles or melted, undispersed nascent polymer domains usually have low antioxidant content and hence are vulnerable to degradation. Such degradation is referred to as thermo-oxidative degradation. Dispersive mixing facilitates the intimate mixing and contact between antioxidant and polymer chains and protects the polymer from thermo-oxidative degradation.

In the present invention, the degree of anti-oxidant (AO) dispersion, and hence the resistance to degradation in downstream processing can be readily determined by persons skilled in the art for a given polyethylene. For example, a person skilled in the art can determine the oxidative-degradation resistance of a high density polyethylene by determining the oxygen initiation time (OIT) using a differential thermal analyses instrument (e.g. differential scanning calorimetry, (DSC)). Similarly, a person skilled in the art can examine the rheological and physical properties of a given polyethylene to determine the temperature at which product integrity suffers. A person skilled in the art could also correlate temperature for a given polyethylene to when crosslinking occurs which itself can be assessed by gel count, or changes in the polymer rheology or physical properties.

In an embodiment of the invention, the thermo-oxidative degradation is measured by an oxidative induction time (OIT) as per ASTM D3895-07. In the present invention, a polyethylene with sufficiently high antioxidant (AO) loading (e.g., in excess of a 1200 ppm) is considered to have insufficient AO dispersion when oxidative induction times are low; for example, below about 15 min, or when the variation of the oxidative induction times obtained for 4 test specimens is large; for example, greater than about 10%.

Apart from good AO dispersion, the melt temperature still has to be managed to ensure that no significant degradation occurs to damage the polymer properties in general. In an embodiment of the invention, a HDPE is not heated beyond about 280° C. anywhere in extruder. In an embodiment of the invention, a HDPE is not heated beyond about 270° C. anywhere in extruder. In an embodiment of the invention, a HDPE is not heated beyond about 260° C. anywhere in extruder. In another embodiment of the invention, a HDPE is not heated beyond about 250° C. anywhere in the reactor.

In an embodiment of the invention the HDPE extruded is such that polymer degradation will occur to a certain degree at a temperature of from 260° C. to 280° C. degrees.

In the present invention, the extruder is run at any screw speed and/or any throughput rate suitable for a particular extruder of a particular size and having the screw configuration and design described herein, to improve polymer homogeneity and/or reduce gels in a given polyethylene, so long as the screw speed and the throughput rate are sufficient to completely melt the polymer within the polymer melting zone, and to keep the polymer melt temperatures in the extruder below a temperature at which polymer degradation occurs.

In an embodiment of the invention the extruder is operated at a throughput of 0.67 M to M in kg of polymer/hour, where $M=aD^b$, where D is the internal diameter of the extruder barrel in mm, b=3.04, and $a=1.54\times10^{-3}$ in kg polymer/hr/$mm^b$.

Figure 3:
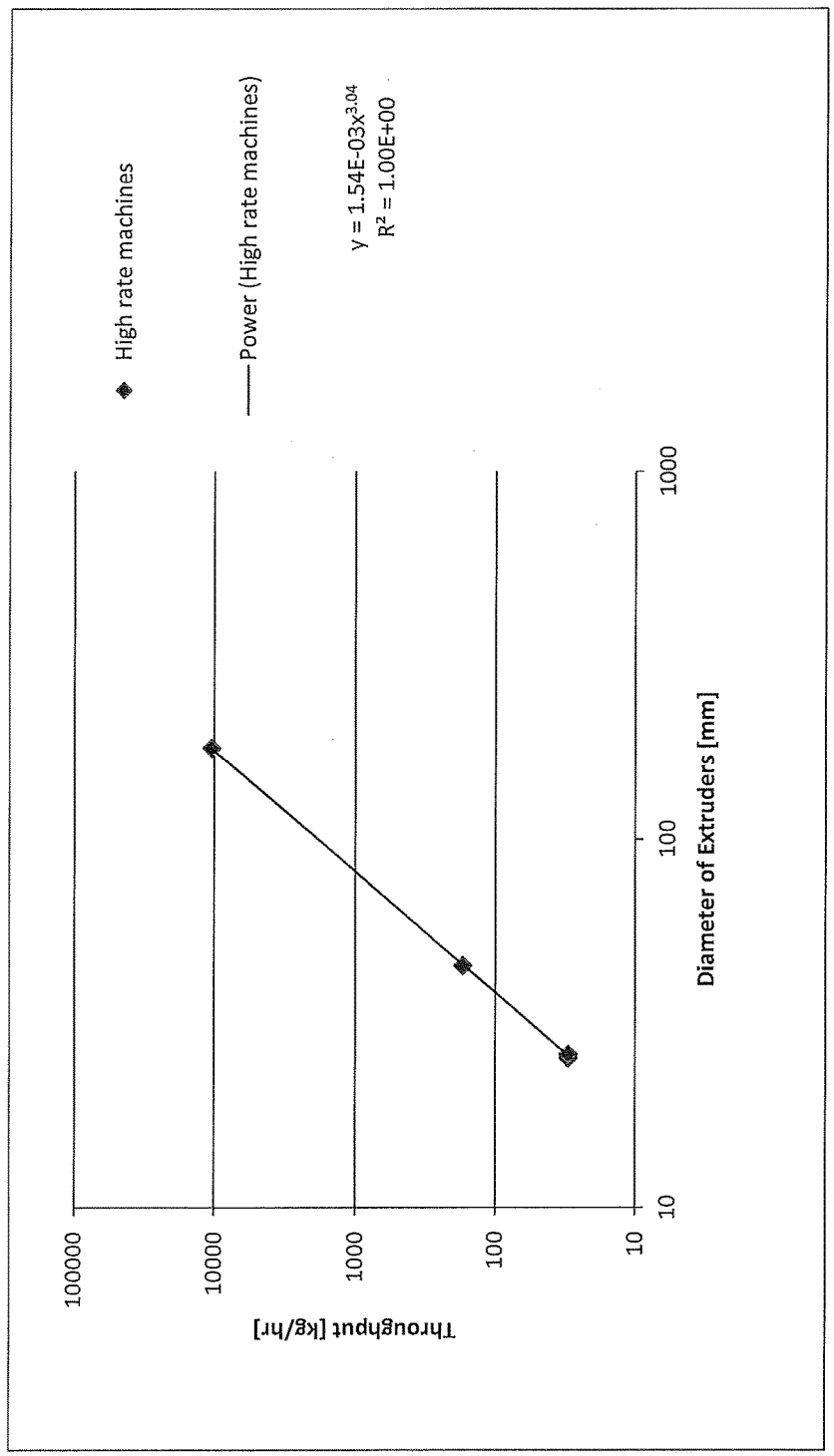
FIG. 3 shows the double log plot of throughput rate vs extruder barrel diameter which gives the constants a and b.

The constants a and b were determined from extrusion experiments carried out on various twin-screw extruders of diameters ranging from 26 mm to 177 mm and which were configured according to the present invention. A regression of experimental throughput rate against the extruder barrel diameter on a double logarithmic scale revealed the values for parameters a and b as shown in FIG. 3. A person skilled in the art will recognize that similar experiments can be carried out on an extruder of any size to determine the constants a and b.

In an embodiment of the invention, the extruder is operated at a screw speed of from 230 to 400 rpm.

In an embodiment of the invention, the extruder is operated at a screw speed of from 230 to 440 rpm at a throughput rate of >0.67M for an extruder of diameter D, where $M=aD^b$ as described above. In another embodiment of the invention, the extruder is operated at a screw speed of from 260 to 330 rpm at a throughput rate of >0.60M for an extruder of diameter D. In an embodiment of the invention, the extruder is operated at a screw speed of from 300 to 360 rpm at the throughput rate of >0.63M. In an embodiment of the invention, the extruder is operated at a screw speed of from 360 to 440 rpm at a throughput rate of >0.67M. M is defined as $M=a\ D^b$ for an extruder of diameter D as described above.

In an embodiment of the invention, a polyethylene is passed through the single stage, twin screw extruder at a screw speed and throughput rate which reduces the number of gels present in the polyethylene by at least 50%.

In an embodiment of the invention, a high density polyethylene is passed through the single stage, twin screw extruder at a screw speed and throughput rate which reduces the number of gels present in the high density polyethylene by at least 50%.

In an embodiment of the invention, the extrusion method reduces the level of gels in a HDPE to from ½ to 1/20 of the original gels level. In an embodiment of the invention, the extrusion method reduces the level of gels in a HDPE to from ⅓ to 1/20 of the original gels level. In an embodiment of the invention, the extrusion method reduces the level of gels in a HDPE to from ¼ to 1/20 of the original gels level. In an embodiment of the invention, the extrusion method reduces the level of gels in a HDPE to from ⅙ to 1/20 of the original gels level. In an embodiment of the invention, the extrusion method reduces the level of gels in a HDPE to from ⅛ to 1/20 of the original gels level. In an embodiment of the invention, the extrusion method reduces the level of gels in a HDPE to from 1/10 to 1/20 of the original gels level. Alternatively, in embodiments of the invention, the extrusion method reduces the level of gels in a HDPE by at least 40%, or at least 50%, or at least 60%, or at least 70%, or at least 75%, or at least 80%, or at least 85%, or at least 90%, or at least 95%.

In an embodiment of the invention, the extrusion method reduces the gel level in a HDPE to less than 35 ppm.

In an embodiment of the invention, the extrusion method reduces the gel level in a HDPE to less than 25 ppm.

In an embodiment of the invention, the extrusion method reduces the gel level in a HDPE to less than 15 ppm.

In an embodiment of the invention, after passing a polyethylene through the single stage, twin screw extruder, the polyethylene has less than 35 ppm of gels. In an embodiment of the invention, after passing a polyethylene through the single stage, twin screw extruder, the polyethylene has less than 25 ppm of gels. In an embodiment of the invention, after passing a polyethylene through the single stage, twin screw extruder, the polyethylene has less than 15 ppm of gels. In an embodiment of the invention, after passing a HDPE through the single stage, twin screw extruder, the HPDE has less than 35 ppm of gels. In an embodiment of the invention, after passing a HDPE through the single stage, twin screw extruder, the HPDE has less than 25 ppm of gels. In an embodiment of the invention, after passing a HDPE through the single stage, twin screw extruder, the HDPE has less than 15 ppm of gels.

In addition to removing gels, the optimized extrusion of the present invention also improves the dispersive mixing of an antioxidant (AO). The quality of the dispersive mixing of an AO may be indicated by the observed oxidative induction time (OIT) which is obtained in general accordance with ASTM D3895-07. The OIT is a measure of resistance to thermo-oxidative degradation for the extruded polymer. Without wishing to be bound by theory, the longer the OIT, the more stable the polymer, the better the mixing of the AO into the polymer.

In an embodiment of the invention, a polyethylene is passed through the single stage, twin screw extruder at a screw speed and throughput rate which increases the oxygen induction time (OIT) of the polyethylene by at least 200%.

In an embodiment of the invention, a HDPE is passed through the single stage, twin screw extruder at a screw speed and throughput rate which increases the oxygen induction time (OIT) of the HDPE by at least 200%.

In an embodiments of the invention, the extrusion method increase the oxidative induction time (OIT) in a HDPE by at least 50%, or at least 75%, or at least 100%, or at least 150%, or at least 200%, or at least 250%, or at least 300%, or at least 350%, or at least 400%.

In an embodiment of the invention, after passing through the single stage, twin screw extruder a high density polyethylene has an OIT of at least 40 min, provided that the high density polyethylene contains at least 500 ppm of each of Irganox 168™ and Irganox 1010™.

In an embodiment of the invention, a HDPE having an $I_{21}$ of from 1-30 g/10 min is passed through an extruder with an at least 150 mm diameter (D) operated at a throughput rate of at least 9000 kg of polymer/hour.

In an embodiment of the invention, a HDPE having an $I_{21}$ of from 1-30 g/10 min is passed through an extruder with an at least 150 mm diameter (D) operated at a throughput rate of at least 9000 kg of polymer/hour to give a HDPE having a gel count of less than 35 ppm.

In an embodiment of the invention, a high density polyethylene is passed through the extruder at a throughput rate of at least 9500 kg (polyethylene) polymer/hour with a twin screw extruder having an internal barrel diameter (D) of at least 177 mm.

In an embodiment of the invention, a HDPE having an $I_{21}$ of from 1-20 g/10 min is passed through an extruder with a 177 mm diameter (D) operated at a throughput rate of at least 9500 kg of polymer/hour. In an embodiment of the invention, a HDPE having an $I_{21}$ of from 1-20 g/10 min is passed through an extruder of 177 mm diameter (D) operated at a throughput rate of at least 10,500 kg of polymer/hour. In an embodiment of the invention, a HDPE having an $I_{21}$ of 2 to 15 g/10 min is passed through an extruder of 177 mm diameter (D) operated at a throughput rate of at least 10,000 kg of polymer/hour. In an embodiment of the invention, a HDPE having an $I_{21}$ of 1-10 g/10 min is passed through an extruder of 177 mm diameter (D) operated at a throughput rate of at least 9,500 kg of polymer/hour.

In an embodiment of the invention, a HDPE having an $I_{21}$ of from 1-20 g/10 min is passed through an extruder of 177 mm diameter (D) operated at a throughput rate of at least 10,000 kg of polymer/hour to give a HDPE having a gel count of less than 35 ppm. In an embodiment of the invention, a HDPE having an $I_{21}$ of from 1-20 g/10 min is passed through an extruder operated at a throughput rate of at least 10,000 kg of polymer/hour to give a HDPE having a gel count of less than 25 ppm. In an embodiment of the invention, a HDPE having an $I_{21}$ of from 1-20 g/10 min is passed through an extruder operated at a throughput rate of at least 10,000 kg of polymer/hour to give a HDPE having a gel count of less than 15 ppm.

In an embodiment of the invention, a HDPE having an $I_{21}$ of from 1-30 g/10 min is passed through an extruder of at least a 26 mm diameter (D) operated in adiabatic condition at a throughput rate of at least 30 kg of polymer/hour.

In an embodiment of the invention, a HDPE having an $I_{21}$ of from 1-30 g/10 min is passed through an extruder of at least a 26 mm diameter (D) operated in adiabatic condition at a throughput rate of at least 30 kg of polymer/hour to give a HDPE having a gel count of less than 35 ppm.

In an embodiment of the invention, a HDPE having an $I_{21}$ of from 1-20 g/10 min is passed through an extruder of 26 mm diameter (D) operated in adiabatic condition and at a 400 rpm screw speed at a throughput rate of at least 33 kg of polymer/hour to give a HDPE having a gel count of less than 35 ppm. In an embodiment of the invention, a HDPE having an $I_{21}$ of from 1-20 g/10 min is passed through an extruder of 26 mm diameter (D) operated in an adiabatic condition and a low screw speed of 230 to 330 rpm for the given configuration at a throughput rate of at least 29 kg of polymer/hour to give a HDPE having a gel count of less than 25 ppm. In an embodiment of the invention, a HDPE having an $I_{21}$ of from 1-20 g/10 min is passed through an extruder operated at 300 rpm and a throughput rate of at least 29 kg of polymer/hour to give a HDPE having a gel count of less than 15 ppm.

Screw Configuration and Screw Elements

The solid conveying section receives a polymer through the inlet and carries it toward the polymer melting zone. Conveying zone screw elements are well known to those skilled in the art, and include for example bi-lobe conveying elements. The solid conveying section has a length of from 20 to 70% of the screw length, preferably more than 50% of the screw length. The bi-lobe conveying element may have a flight angle of from 10 to 34 degrees. The conveying section may be configured to have a gradually decreasing flight angle from the polymer inlet to the end of the conveying section.

In the present invention, the polymer melting zone is not designed to carry out mixing. Instead, it is designed to subject the polymer solid to intensive extensional stress within a short axial length to melt the polymer as instantaneously as possible and to avoid premature partial melting as much as possible.

In an embodiment of the invention, the polymer melting zone comprises (in order from upstream to downstream along an extruder screw where downstream is toward the extruder exit and screw terminal end) a transitional kneading block (which allows smooth flow from the preceding solid polymer conveying zone), one or more tri-lobe kneading blocks, another transitional kneading block (which allows smooth flow from the preceding tri-lobe kneading blocks to a downstream bi-lobe kneading block), one or more bi-lobe kneading blocks, and one or more left handed screw elements to ensure complete filling of the preceding screw elements within the polymer melting section. The left-hand element was found to be important in order to avoid partial melting.

In an embodiment of the invention, the polymer melting zone comprises at least one tri-lobe kneading block or at least one bi-lobe/tri-lobe combination kneading block of a length of from 0.25 to 0.50 times the barrel inner diameter D.

In an embodiment of the invention, the polymer melting zone comprises a kneading block configuration which provides a geometry which is equivalent to at least three kneading disks each having a length of 0.03 to 0.125 times the barrel inner diameter and which are staggered to one another by an angle of 30 to 60 degrees relative to a right handed helix direction.

A person skilled in the art will recognize that other screw element configurations can be used so long as complete melting is achieved within the polymer melting section.

In an embodiment of the invention, the dispersive mixing zone comprises dispersive mixing elements and pumping elements. For example, the dispersive mixing elements may comprise 4 or more kneading disks which form a kneading block section having a total length of from 0.25 to 0.75 times the internal barrel diameter D. The 4 or more kneading disks may be staged to be 90 degrees from one another. The pumping elements can comprise one or more standard bi-lobe pumping elements located upstream and/or downstream of the dispersive mixing elements. These bi-lobe pumping elements may, for example, have a flight angle of 15 to 24 degrees and a length of at least 1.0 times the internal barrel diameter D.

In an embodiment of the invention, the total length of the pumping elements associated with the dispersive mixing zone can be 0.5 to 6 times the internal barrel diameter, with an optimum value of from 0.7 D to 2.5 D. This helps to minimize the polymer melt temperature increases over the dispersive mixing zone and thus to avoid polymer degradation.

In an embodiment of the invention, the distributive mixing zone comprises a mixture of melt pumping elements and distributive mixing elements such as for example kneading blocks and/or gear elements. As a non-limiting example of a dispersive mixing element, a turbine mixing element (TME) or Zahn Misch element (ZME) may be used, or single flight elements may be used.

In an embodiment of the invention, the total length of the pumping elements in the distributive mixing zone can be from 0.5 to 6 times the internal diameter of the barrel. In another embodiment of the invention, the total length of the pumping elements in the distributive mixing zone can be from 0.7 D to 2.5 D. This helps to minimize the polymer melt temperature increases over the distributive mixing zone and thus to avoid polymer degradation.

The pumping zone comprises one or more polymer melt conveying (i.e. pumping) elements.

Optionally, a venting section can be included between the melting zone and the distributive mixing zone.

The invention is further illustrated by the following non-limiting examples.

EXAMPLES

Melt index, $I_2$, in g/10 min was determined on a Tinius Olsen Plastomer (Model MP993) in accordance with ASTM D1238 Procedure A (Manual Operation) at 190° C. with a 2.16 kilogram weight. High load melt index, $I_{21}$, in g/10 min was determined in accordance with ASTM D1238 Procedure A at 190° C. with a 21.6 kilogram weight. Melt flow ratio (also sometimes called melt index ratio) is $I21/I2$.

Polymer density was determined in grams per cubic centimeter (g/cc) according to ASTM D792.

Polymer molecular weight information such as $M_w$, $M_n$ and $M_z$ (in g/mol) and molecular weight distribution ($M_w/M_n$), z-average molecular weight distribution ($M_z/M_w$) and modality (e.g. unimodal, bimodal or multimodal, broad or narrow chromatograph profile) can be obtained by gel permeation chromatography (GPC), using an instrument sold under the trade name "Waters 150c", with 1,2,4-trichlorobenzene as the mobile phase at 140° C. Samples can be prepared by dissolving the polymer in 1,2,4-trichlorobenzene and can be run without filtration. Molecular weights are expressed as polyethylene equivalents with a relative standard deviation of 2.9% for the number average molecular weight ("$M_n$") and 5.0% for the weight average molecular weight ("$M_w$"). Polymer sample solutions (1 to 2 mg/mL) may be prepared by heating a polymer in 1,2,4-trichlorobenzene (TCB) and rotating on a wheel for 4 hours at 150° C. in an oven. An antioxidant 2,6-di-tert-butyl-4-methylphenol (BHT) may be added to the mixture in order to stabilize the polymer against oxidative degradation. A BHT concentration of 250 ppm is appropriate. Sample solutions can be chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT may be added to the mobile phase at a concentration of 250 ppm to protect the columns from oxidative degradation. Sample injection volume of 200 mL is appropriate. The raw data may be processed with a Cirrus GPC software. The GPC columns can be calibrated with narrow distribution polystyrene standards. The polystyrene molecular weights were converted to polyethylene molecular weights using the Mark-Houwink equation, as described in the ASTM standard test method D6474.

The gel levels (in ppm) are detected with an OCS Cast Film Digital Gel measurement Systems on a cast film. It is the total area of defects over the total tested area of 10 m².

Oxidative induction time (OIT) is a measure of the resistance to oxidative thermo-degradation of polyolefins. It is the induction time before onset of the endotherms in exposure to oxygen at a given temperature, typically 200° C. The tests were performed in accordance with ASTM D3895-07 with a TA Q100 DSC instrument on compression molded specimens with a nominal 0.25 mm thickness and 6.4 mm diameter.

Impact resistance is measured at room temperature with Charpy Impact tests in general accordance with ASTM D6110-10 except that the specimens have a sharp notch. The dimension of the specimens was: thickness: 3.0±0.2 mm; width: 10.0±0.2 mm; length: 80.0±0.2 mm; depth of notch: 2.50±0.02 mm. The sharp notch is made by slowly with a fresh razor in a controlled manor. After notching, the specimens are conditioned for a minimum of 24 hours before testing. The impact energy on the notched specimens thus measured is a measurement of the fracture toughness of polyethylene that is mainly in in-plain strain mode. It is a reproducible approximation of the more fundamental material property—critical strain energy release rate without correction for minor variation for sample thickness and the ratio of crack depth over sample width.

PENT is an abbreviation of the Pennsylvania Notch Test. The test measures the failure times of asymmetrically sharp-notched samples in a constant tensile load in a controlled condition as per ASTM 1473 "Standard Test Method for the Notched Tensile Test to Measure Slow Crack Growth Resistance of Polyethylene—PE Notch Test". The PENT values in hours are in general a measure of the slow crack growth of polyethylene (PE) resins or extruded solid wall pipe. The test is usually performed at 2.4 MPa and 80° C. per ASTM 1473 F1473-11. For accelerated testing of polymer compositions with very high slow crack growth resistance, the PENT test can be performed at an elevated stress level where failure is still brittle in nature. As an example, the test can be run at 3.0 MPa and 80° C., resulting in shorter failure times that could be approximately half as long as those measured at 2.4 MPa and the same temperature if the same brittle failure dominates the PENT test.

The current invention provides improved dispersive mixing without excessive melt temperatures and without significant polymer degradation. This is beneficial not only for reducing gels but also results in an improvement in resin homogenization and dispersion of high molecular weight fractions and additives in the nascent resin, which in turn significantly improves resin toughness. These improvements are illustrated in the below examples.

Extrusion experiments were performed using a fully intermeshing, co-rotating twin screw extruder (co-TSE) from Coperion of internal diameter D and a total length of 32 D, with D=26 mm and D/Di=1.53, where $D_i$ is the screw diameter at the valley (narrowest location). The standard single stage co-TSE was equipped with several screw configurations in order to find the optimized conditions to reduce gels while minimizing impact on the polyethylene quality. The barrel temperatures were set at the levels close to projected resin temperatures inside the barrel according to simulation using the WINTXs software under adiabatic conditions (first the temperature of the resin in the extruder is predicted, then the extruder barrel temperature is set to closely match the predicted resin temperature). In all the following examples, the ethylene polymer tested and extruded was a granular HDPE having high molecular weight, broad unimodal molecular weight distribution, a density of 0.940 g/cm$^3$ and high load melt index, $I_{21}$ of 12 g/10 min. The gel levels of the granular resin, before extrusion were greater than about 100 ppm when measured with the OCS system. Characterization using an optical microscope with hot stage and FRIT reveals that the gels were mainly non-oxidized HDPE. The granular resin contained less than 210 ppm of the antioxidant Irganox 1076™. Prior to extrusion, the resin was dry blended with 500 ppm each of Irganox 168™ and Irganox 1010™ for some extrusion examples, and 1200 ppm each for other extrusion examples.

In the inventive examples, the HDPE material described above was extruded using screw configuration described in Table 1. FIG. 1 shows this general screw configuration.

TABLE 1

| Extruder Zone Function | Element[1] | Element Length | Ele- ment L/D | Accu- mula- tive L/D | Barrel Temper- ature ° C. |
|---|---|---|---|---|---|
| Solid conveying | SE 48/48 or 48/24 | 276 | 10.62 | 22.38 | 65 to 180 |
|  | SE 36/36 or 36/18 | 306 | 11.77 |  |  |
| Melting | KB 45/5/18 N—3Fe | 18 | 0.69 | 24.23 | 240 |
|  | KB 45/5/18 3Fe—N | 18 | 0.69 |  |  |
|  | KB 45/5/12 LH | 12 | 0.46 |  |  |
| Pumping + Dispersive mixing | SE 36/36 | 36 | 1.38 | 27.96 | 230 |
|  | KB 90/5/24 | 24 | 0.92 |  |  |
|  | SE 24/24 | 36 | 1.38 |  |  |
|  | Spacer | 1 | 0.04 |  |  |

TABLE 1-continued

| Extruder Zone Function | Element[1] | Element Length | Ele- ment L/D | Accu- mula- tive L/D | Barrel Temper- ature ° C. |
|---|---|---|---|---|---|
| Distributive mixing | 2 TME 22.5/6 | 12 | 0.46 | 28.46 |  |
|  | Spacer | 1 | 0.04 |  |  |
| Pumping | SE 36/36 | 36 | 1.38 | 31.81 | 220 |
|  | Spacer | 3 | 0.12 |  |  |
|  | SE 24/24 SF | 24 | 0.92 |  |  |
|  | SE 24/24 SF | 24 | 0.92 |  |  |

Note
[1]The elements are briefly described as: SE XX/YY: polymer solid conveying or polymer melt pumping elements, which are double-flighted screw elements with a lead of XX and a length of YY, both in millimeter; KB 45/5/12: forward pumping kneading blocks, which have the geometry equivalent to 5 kneading disks stacked 45° from each other counter clock-wise when viewed from downstream to a total length of 12 mm; KB 45/5/12 LH: reverse pumping kneading blocks, similar to KB 45/5/12 except with clock-wise stacking among disks; KB 90/5/ZZ: dispersive mixing element(s); neutral kneading blocks, which have the geometry equivalent to 5 kneading disks stacked 90° from each other to a total length of ZZ = 24 mm; TME 22.5/6: distributive mixing element(s); turbine mixing element of a total length of 6 mm used in duplicate.

Figure 2:
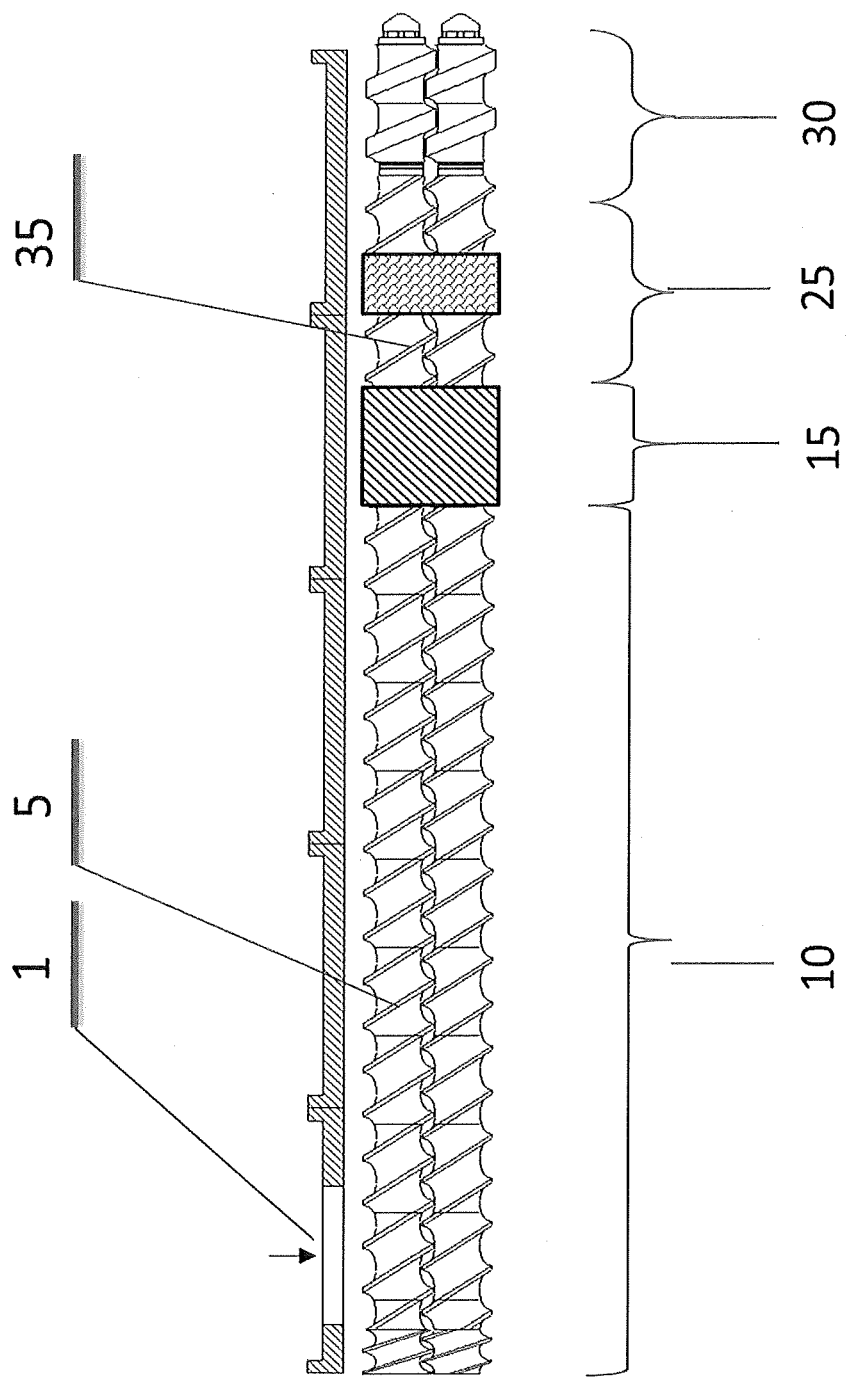
FIG. 2 shows a top plan view (in partial cross-section; the extruder barrel is cut away) of a twin screw extruder having a distributive mixing zone but no dispersive mixing zone.

In the comparative examples, the HDPE material described above was extruded using the screw configuration described in Table 1, expect that the dispersive mixing elements were omitted. FIG. 2 shows this general screw configuration.

The resulting extrusion conditions, as well as the corresponding gel count of the extruded HDPE are given in Table 2. The specific mechanical energy (SME) which is the mechanical energy imparted to the polymer during extrusion, the melt temperature, the screw speed, and the screw configuration are all shown for extrusions carried out at a constant throughput rate of 29 kg polymer/hr. In each case, the extruder conditions are optimized so that the polymer is completely melted in the polymer melting zone. The type of mixing occurring in each zone, is determined by the type of screw element used, but has also been validated with WINTXs simulation software. For example elements which provided too little or too much thermal energy in the melting zone or use of a melting zone consisting of kneading elements spaced by conveying elements were found to give poor gel counts.

TABLE 2

| Extrusion Example No. | Screw Speed (rpm) | Screw Config- uration | Type of Mixing | SME (kWhr/ kg) | $T_m$ (° C.) | Gels (ppm) |
|---|---|---|---|---|---|---|
| 1 | 400 | as per Table 1 | intensively dispersive + distributive | 0.236 | 266 | 10.7 |
| 2 (inventive) | 300 |  |  | 0.216 | 251 | 14.6 |
| 3 | 400 | as per Table 1, but where ZZ = 12 mm | moderately dispersive + distributive | 0.235 | 266 | 13.9 |
| 4 (inventive) | 300 |  |  | 0.214 | 251 | 17.7 |
| 5 | 400 | as per Table 1, but without dispersive mixing elements | distributive only | 0.215 | 250 | 22.8 |
| 6 | 300 |  |  | 0.193 | 239 | 20.0 |

The data in Table 2 show that the inclusion of dispersive mixing zone elements downstream of the melting zone and upstream of the distributive mixing zone, be it a moderate dispersive mixing element (ZZ=12 mm) or an intensive dispersive mixing element (ZZ=24 mm), reduces the gel levels present in an extruded polyethylene relative to an extruded polyethylene extruded at the same high throughput rate but in the absence of dispersive mixing elements.

Compare example nos. 1 and 3 with example no. 5. However, if the screw speed is left unchanged, the specific mechanical energy (SME) imparted to the polymer increases, as does the polymer melt temperature. Hence, at the same high throughput, leaving the screw speed unchanged while adding a dispersive mixing zone subjects the polymer to temperatures and stresses that may lead to polymer degradation. By optimizing the screw speed for a given high throughput, as can be seen in example nos. 2, 4 and 6, the specific mechanical energy imparted to the polyethylene and the rise of polymer melt temperature can be alleviated. This is especially important when a dispersive mixing zone is present. In order to prevent polymer degradation, the screw speed of the extruder can be decreased to a new set point when extrusion is carried out using a dispersive mixing zone (examples nos. 2 and 4). Hence, by optimizing the screw speed for a given high throughput, in the presence of a dispersive mixing zone, the specific mechanical energy and the rise of polymer melt temperature can be alleviated, while at the same time reducing gels to levels below that obtained in the absence of dispersive mixing. Compare example nos. 2 and 4 with example no. 6.

In view of the forgoing, a person skilled in the art will recognize that the extrusion method of the present invention allows one to maintain the same high throughput for a given polyethylene resin and further decrease the number of gels while not subjecting the polyethylene to melt temperatures and energies that lead to polymer degradation.

In addition to removing gels, the extrusion of the present invention also improves the dispersive mixing of an antioxidant (AO). Table 3 shows examples of improved mixing of an AO as observed by oxidative induction time (OIT) in general accordance with ASTM D3895-07. OIT is a measure of resistance to thermo-oxidative degradation for the extruded polymer. Without wishing to be bound by theory, the longer the OIT, the more stable the polymer, the better the mixing of the AO into the polymer. Standard deviation of OIT through duplicate tests on the same sample indicates dispersion of antioxidants in the sample. In actual testing, when the first two replica tests on the same sample show more than 10% deviation, the uniformity of antioxidant is considered unsatisfactory and two extra tests are performed to obtain a reliable OIT measurement. Samples for which data is given for Test 1 and Test 2, but not for Test 3 and Test 4 have a more uniform AO dispersion than those required the two additional tests (T3 and T4).

As shown in Table 3, the OIT values of the samples taken from a plaque molded from resins (a HDPE having a density of 0.940 g/cc and a $I_{21}$ of 12 g/10 min) either in granular form or as pellets are clearly a function of the screw configuration (dispersive mixing vs no dispersive mixing) and extrusion conditions. The samples were compression-molded into a plaque in general accordance with ASTM D4703-10a with a picture-frame type mold at 175° C. for 5 min and then cooled under pressure to 55° C. at a cooling rate of about 10° C./min. In each case, the extruder conditions are optimized so that the polymer is completely melted in the polymer melting zone and so that polymer degradation is avoided.

Example no. 7 is un-extruded HDPE which has a minimal amount (about 220 ppm) of antioxidant present (e.g. the antioxidant Octadecyl 3-(3,5-di-tert-butyl-4-hydroxyphenyl)propionate (Irgafos I1076) is present). Example no. 8 is un-extruded HDPE to which antioxidants Tris(2,4-di-tert-butylphenyl) phosphite (Irgafos I168), Pentaerythritol Tetrakis(3-(3,5-di-tert-butyl-4-hydroxyphenyl)propionate) (Irgafos I1010), and Octadecyl 3-(3,5-di-tert-butyl-4-hydroxyphenyl)propionate (Irgafos I1076) have been added in the amount of 500 ppm each. Example nos 9-14 correspond to extruded HDPE resins. Example nos. 7-11 are comparative. Examples nos. 12-14 are inventive.

The OIT values of example nos. 12-14 which correspond to HDPE extruded with the screw configuration detailed in Table 1, which includes a dispersive mixing zone are significantly higher than those of example nos. 9-11, which were extruded with the screw configuration of Table 1, but not including the dispersive mixing elements. When the dispersive mixing zone is absent, at maximum throughput and a screw speed of 400 rpm (example no. 9) or 290 rpm (example no. 11), the dispersion of the AO in the HDPE is poor relative to when a lower throughput rate is used (see example no. 10). When using the configuration with the dispersive mixing zone, however, the dispersion of the AO remains high, even when lower screw speed is used at a high throughput of 29 kg/hr (see example no. 14). Further, when the dispersive mixing zone is included in the screw configuration, the variation of OIT is large only at extremely high throughput (i.e. a throughput of 33 kg polymer/hr).

TABLE 3

| Example | HDPE | Screw Configuration[2] | Screw Speed, Throughput | Test 1 | Test 2 | Test 3 | Test 4 | Average |
|---|---|---|---|---|---|---|---|---|
| 7 | As-is | N/A | N/A | 10.29 | 13.37 | 13.43 | 10.01 | 11.8 |
| 8 | As-is + AO | N/A | N/A | 15.83 | 16.24 | — | — | 16.0 |
| 9 | As-is + AO | no dispersive | 400 rpm, 33 kg/hr | 38.67 | 38.07 | — | — | 38.4 |
| 10 | As-is + AO | mixing | 400 rpm, 23 kg/hr | 49.16 | 42.73 | 49.13 | 42.65 | 45.9 |
| 11 | As-is + AO | | 290 rpm, 29 kg/hr | 45.78 | 44.00 | — | — | 44.9 |
| 12 | As-is + AO | with dispersive | 400 rpm, 33 kg/hr | 77.66 | 83.90 | 77.46 | 83.95 | 80.7 |
| 13 | As-is + AO | mixing | 400 rpm, 23 kg/hr | 81.89 | 80.38 | — | — | 81.1 |
| 14 | As-is + AO | | 290 rpm, 29 kg/hr | 89.80 | 89.36 | — | — | 89.6 |

Note
[2]the two SE 24/24 elements at the screw tips were replaced with 2 SE 36/36 in these examples while the length of solid conveying zone was reduced accordingly to maintain the same overall screw length.

From the data in Table 3, it is evident that the use of dispersive mixing elements results in much higher OIT values over all optimized extrusion conditions than does a screw configuration not including dispersive mixing elements.

A person skilled in the art will recognize from the data in Table 3, that use of a screw design containing a dispersive mixing element and optimized operating conditions (i.e., throughput and screw speed) significantly improves the AO mixing and hence the oxidative degradation resistance of HDPE.

The toughness of a polymer is also improved using the extrusion method of the present invention. Polymer toughness may be indicated by the impact strength of a polymer which is obtained using the Charpy impact test. Another measure of polymer toughness is indicated by the resistance to crack propagation.

The polyethylene examined was a HDPE with a high load melt index $I_{21}$ of 12 g/10 min and a density of 0.940 g/cm³ as described earlier. The resin, after dry blended with 1000 ppm each of Irganox 168 and Irganox 1010, was extruded with different screw designs under different conditions and compression molded into plaques for Impact and PENT testing. The samples were compression-molded into a plaque in general accordance with ASTM D4703-10a with a picture-frame type mold at 175° C. for 5 min and then cooled under pressure to 55° C. at a cooling rate of about 10° C./min.

A screw design having only a distributive mixing zone was compared to a screw design comprising both a dispersive mixing zone and a distributive mixing zone. In each case, extrusion was optimized to fully melt the polymer in the polymer melting zone and to avoid polymer degradation temperatures. The results are shown in Table 4. The impact strength for the HDPE extruded using an optimized screw configuration having both a distributive mixing zone and a dispersive mixing zone was significantly higher when the extrusion is carried out at lower screw speed (rpm).

TABLE 4

| | | Impact Strength (standard deviation), in Joules | | PENT (standard deviation) at 3.0 MPa, in hours | |
| --- | --- | --- | --- | --- | --- |
| | | Throughput 29 kg/hr Screw speed | | | |
| | | 400 rpm | 300 rpm | 400 rpm | 300 rpm |
| Ex No. 15 (comparative) | Distributive Mixing Only | 0.34 (0.02) | 0.34 (0.02) | 1172 (2.8) | >1143 (386) |
| Ex. No 16. (inventive) | Dispersive and Distributive Mixing | 0.034 (0.02) | 0.40 (0.02) | 1004 (22) | 1263 (216) |

From the data in Table 4, a person skilled in the art will recognize that the inventive extrusion provides improved toughness (impact strength) at lower screw speeds (compare example no 15 with example no 16). Also shown in Table 4, is the slight improvement in slow crack growth obtained using the inventive extrusion method with lower screw speed. Hence, the increase in impact strength is not achieved at the expense of PENT values, as is often the case when extruding unimodal HPDE resins.

Without wishing to be bound by theory, the higher impact strength and PENT values obtained at the lower screw speeds, are thought to be the result of better mixing, leading to a more homogenous polymer which has better dispersion of high molecular weight fractions.

INDUSTRIAL APPLICABILITY

Extrusion is often an important finishing step in the commercial production of polymers such as, for example, high density polyethylene. Extrusion is used to incorporate additives and to produce product polymers which have reduced levels of gels and inhomogeneities. The current invention provides an improved extrusion method.

The invention claimed is:

1. A method for extruding polyethylene, the method comprising passing the polyethylene through a single stage, twin screw extruder comprising:
   a) a solid polymer conveying zone;
   b) a polymer melting zone immediately downstream of the solid polymer conveying zone where the distance between the beginning of the polymer melting zone and a screw terminal end is less than 50% of a screw length; and wherein the polymer melting zone has a length which is 5 to 15% of the screw length;
   c) a dispersive mixing zone downstream of the polymer melting zone, the dispersive mixing zone comprising one or more dispersive mixing element(s);
   d) a distributive mixing zone downstream of the dispersive mixing zone, the distributive mixing zone comprising one or more distributive mixing element(s);
   e) at least one pumping element between the polymer melting zone and the dispersive mixing element(s);
   f) at least one pumping element between the dispersive mixing element(s) and the distributive mixing element(s);
   g) and a pumping zone downstream of the distributive mixing zone;
   wherein the polyethylene is passed through the single stage, twin screw extruder at a screw speed and throughput rate which completely melts the polyethylene within the polymer melting zone and which keeps the polymer melt temperature in the extruder below a temperature at which degradation of the polyethylene occurs.

2. The method of claim 1, wherein the twin screw extruder is a co-rotating twin screw extruder.

3. The method of claim 1, wherein the twin screw extruder is operated at a throughput rate of 0.67 M to M in kg of polymer/hour, where M=a $D^b$, D is the internal diameter of the extruder barrel in mm, b=3.04, and a=1.54×10⁻³ in kg polymer/hr/mm$^b$.

4. The method of claim 1, wherein the extruder is operated at a screw speed of from 230 to 400 rpm.

5. The method of claim 1, wherein the polyethylene is a high density polyethylene having a density of from 0.939 to 0.960 g/cm³.

6. The method of claim 5, wherein the high density polyethylene has a high load melt index $I_{21}$ of from 2 to 15 g/10 min.

7. The method of claim 5, wherein after passing through the single stage, twin screw extruder, the high density polyethylene has less than 25 ppm of gels.

8. The method of claim 5, wherein after passing through the single stage, twin screw extruder, the high density polyethylene has less than 15 ppm of gels.

9. The method of claim 5, wherein after passing through the single stage, twin screw extruder the high density polyethylene has an OIT of at least 40 min, provided that the high density polyethylene contains at least 500 ppm of each of Irganox 168™ and Irganox 1010™.

10. The method of claim 5, wherein the high density polyethylene is passed through the extruder at a throughput rate of at least 9500 kg polymer/hour with a twin screw extruder having a barrel internal diameter of at least 177 mm.

11. The method of claim 1, wherein the polyethylene is passed through the single stage, twin screw extruder at a screw speed and throughput rate which reduces the number of gels present in the polyethylene by at least 50%.

12. The method of claim 1, wherein the polyethylene is passed through the single stage, twin screw extruder at a screw speed and throughput rate which increases the oxygen induction time (OIT) of the polyethylene by at least 200%.

13. The method of claim 3, wherein the extruder is operated at a screw speed of from 230 to 400 rpm.

* * * * *